United States Patent
Gunugunuri et al.

(10) Patent No.: US 11,278,871 B2
(45) Date of Patent: Mar. 22, 2022

(54) DIRECT NO DECOMPOSITION CATALYST

(71) Applicant: Toyota Motor Engineering & Manufacturing North America, Inc., Plano, TX (US)

(72) Inventors: Krishna Gunugunuri, Canton, MI (US); Charles Alexander Roberts, Farmington Hills, MI (US); Torin C. Peck, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 13 days.

(21) Appl. No.: 16/818,430

(22) Filed: Mar. 13, 2020

(65) Prior Publication Data

US 2021/0283584 A1    Sep. 16, 2021

(51) Int. Cl.
| | | |
|---|---|---|
| *B01J 23/75* | (2006.01) | |
| *B01J 21/00* | (2006.01) | |
| *B01J 37/03* | (2006.01) | |
| *B01J 37/06* | (2006.01) | |
| *B01J 37/02* | (2006.01) | |
| *B01J 37/08* | (2006.01) | |
| *B01D 53/94* | (2006.01) | |
| *F01N 3/28* | (2006.01) | |

(52) U.S. Cl.
CPC .......... *B01J 23/75* (2013.01); *B01D 53/9413* (2013.01); *B01J 21/005* (2013.01); *B01J 37/0236* (2013.01); *B01J 37/035* (2013.01); *B01J 37/06* (2013.01); *B01J 37/08* (2013.01); *F01N 3/2803* (2013.01); *B01D 2255/20761* (2013.01); *B01D 2255/405* (2013.01)

(58) Field of Classification Search
CPC ...... B01D 53/9413; B01D 2255/20761; B01D 2255/20746; B01D 2255/405; B01D 2257/402; B01D 2257/404; B01D 2258/012; B01J 23/005; B01J 23/72; B01J 23/75; B01J 37/03; B01J 37/035; B01J 2523/17; F01N 3/10; F01N 3/2066; F01N 2570/14
See application file for complete search history.

(56) References Cited

U.S. PATENT DOCUMENTS 9,663,725 B2 * 5/2017 Bourane ................ C10G 29/16
10,434,471 B2   10/2019 Peck et al.

FOREIGN PATENT DOCUMENTS

EP    3 400 101 A1 * 11/2018 ......... C07C 7/14808

OTHER PUBLICATIONS

Kamila, S. et al., "Synthesis and Structural Analysis of Different CuO Nano Particles," International Journal of Applied Science and Engineering, 14, 3: (2017) pp. 133-146.
Phiwdang, K. et al., "Synthesis of CuO Nanoparticles by Precipitation Method Using Different Precursors," Energy Proceda 34 (2013) pp. 740-745.
Dörner, L. et al., "Cost-effective sol-gel synthesis of porous CuO nanoparticles aggregates with tunable specific surface area," Scientific Reports, 9:11758 (2019), 13 pages.
Galenda, A., "CuOx/CeO2 Nanocomposites Prepared by Deposition-Precipitation: An EPS Study," 36 Surface Science Spectra, vol. 16 (2009) 4 pages.
Chang, M., et al., "Preparation of copper oxide nanoparticles and its application in nanofluid," Powder Technology 207 (2011) pp. 378-386.
Davarpanah, S. et al., "Synthesis of Copper (II) Oxide (CuO) Nanoparticles and Its Application as Gas Sensor," Journal of Applied Biotechnology Reports, vol. 2, Issue 4 (2015) pp. 329-332.
Keikhaei, M. et al., "Fabrication of Copper Oxide Thin Films by Galvanostatic Deposition from Weakly Acidic Solutions," Int. J Electrochem. Sci., 13 (2018) pp. 9931-9941.
Koshy, J. et al., "Corrleated barrier hopping of CuO nanoparticles," Journal of Semiconductors, vol. 36, No. 12 (2015) p. 122003-1-12203-6.
Mahapatra, O. et al., "Ultrafine dispersed CuO nanoparticles and their antibacterial activity," Journal of Experimental Nanoscience, vol. 3, No. 3 (2008) pp. 185-193.
Avgouropoulos, G. et al., "Influence of the preparation method on the performance of CuO-CeO2 catalysts for the selective oxidation of CO," Applied Catalysis B: Environmental, vol. 56, Issues 1-2 (2005) pp. 87-93.
Fan, H. et al., "Controlled synthesis of monodispersed CuO nanocrystals," Nanotechnology 15 37 (2004) (Abstract only) 1 page.

* cited by examiner

*Primary Examiner* — Timothy C Vanoy
(74) *Attorney, Agent, or Firm* — Christopher G. Darrow; Darrow Mustafa PC

(57) ABSTRACT

An improved catalyst system is provided for the direct decomposition removal of $NO_x$ from an exhaust gas stream at temperatures between about 350° C. and about 600° C. that employs an (amorphous $CuO_x$)/$Co_3O_4$ catalyst. The catalyst has an amorphous $CuO_x$ deposit on the surfaces of particles of $Co_3O_4$ spinel oxide. The catalyst is configured to reduce $NO_x$ to $N_2$ without the presence of a reductant. The (amorphous $CuO_x$)/$Co_3O_4$ catalyst is formed by the precipitation of the deposit from solution onto a suspension of $Co_3O_4$ spinel oxide particles. The catalyst system can be employed in a catalytic converter for the direct decomposition removal of $NO_x$ from an exhaust gas stream flowing at a temperature of less than or equal to about 500° C.

16 Claims, 3 Drawing Sheets

DIRECT NO DECOMPOSITION CATALYST

TECHNICAL FIELD

The present disclosure generally relates to catalysts for treatment of an exhaust gas stream and, more particularly, to a superior copper oxide/cobalt oxide catalyst for removal of nitrogen oxides from a low temperature exhaust gas stream as generated by an internal combustion engine, or the like.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

The catalytic removal of NOx from exhaust emissions is desirable for protection of the environment and compliance with regulations directed to clean air. Catalysts that convert NOx to inert nitrogen gas over other nitrogen-containing compounds are particularly desirable. NOx reduction catalysts that are effective at low temperature may have additional utility for vehicles.

The achievement of greater fuel economy from vehicles and automobile engines with effective removal of NO from their exhausts will require catalytic NO abatement technologies that are effective under lean-burn conditions. Removal by direct NO decomposition to $N_2$ and $O_2$ is an attractive alternative to NO traps and selective catalytic reduction (SCR). Currently, NO traps and SCR processes are highly dependent on reductants such as unburned hydrocarbons and carbon monoxide to mitigate $NO_x$. The development of an effective catalyst for direct $NO_x$ decomposition would eliminate the need of reducing agents, simplifying the $NO_x$ removal process, and therefore decreasing the cost to achieve greater fuel efficiency because of the costs for $NO_x$.

Few catalysts active for direct NO decomposition are efficient at temperatures lower than about 600° C., which is not practical for state-of-the-art vehicle exhaust gas streams, which typically are at temperature below about 500° C. Current catalysts known for direct $NO_x$ decomposition include: Cu-ZSM5, a $Cu^{+2}$ ion-exchanged zeolite; alkali metal cobalt oxide lattice, $K/Co_3O_4$ and $Na/Co_3O_4$; $Ag/Co_3O_4$; and CuO. Unfortunately, none of these catalysts display low temperature activity and are selective for $NO_x$ decomposition to $N_2$. Recently, a catalyst comprised of copper oxides dispersed on a spinel $Co_3O_4$ support has achieved good catalytic activity at temperatures as low as about 300° C. for the direct conversion of nitrogen oxides to nitrogen gas in a cool lean exhaust gas stream. Still, further improvement in catalyst activity and cost effectiveness for the preparation of a direct NOx decomposition catalyst system remains desirable.

SUMMARY

This section provides a general summary of the disclosure and is not a comprehensive disclosure of its full scope or all of its features.

In various aspects, the present teachings provide an improved catalyst system for the direct decomposition removal of $NO_x$ from a cool exhaust gas stream. In various aspects, the exhaust stream displays a temperature that is between about 350° C. and about 600° C. The catalyst system includes a spinel $Co_3O_4$ support. An amorphous $CuO_x$ is deposited on a surface of the $Co_3O_4$ spinel oxide, providing an (amorphous $CuO_x$)/$Co_3O_4$ catalyst that is configured to catalyze a reduction of the $NO_x$ to generate $N_2$ without the presence of a reductant.

In other aspects, the present teachings provide a method to prepare the amorphous $CuO_x$/$Co_3O_4$ catalyst by a deposition-precipitation of the amorphous $CuO_x$ on the support. The deposition-precipitation method permits the formation of high loadings of amorphous $CuO_x$ on the metal oxide support and very active and selective catalysts for the reduction of $NO_x$ to $N_2$.

In other aspects, the present teachings provide a catalytic converter for the direct decomposition removal of $NO_x$ from an exhaust gas stream flowing at a temperature of less than or equal to about 500° C. In various aspects, the catalytic converter includes an inlet configured to receive the exhaust gas stream into an enclosure, and an outlet configured to allow the exhaust gas stream to exit the enclosure. A catalyst system may be contained inside the enclosure. The catalyst system may include an (amorphous $CuO_x$)/$Co_3O_4$ catalyst that is configured to catalyze a reduction of the $NO_x$ to generate $N_2$ without the presence of a reductant.

In still further aspects, the present teachings provide methods for the direct decomposition removal of $NO_x$ from a low temperature exhaust gas stream. In various implementations, the methods may include flowing the exhaust gas stream through an enclosure with a catalyst system and contacting the exhaust gas stream to an (amorphous $CuO_x$)/$Co_3O_4$ catalyst surface. The methods include catalyzing a reduction of the $NO_x$ to $N_2$ without the presence of a reductant.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
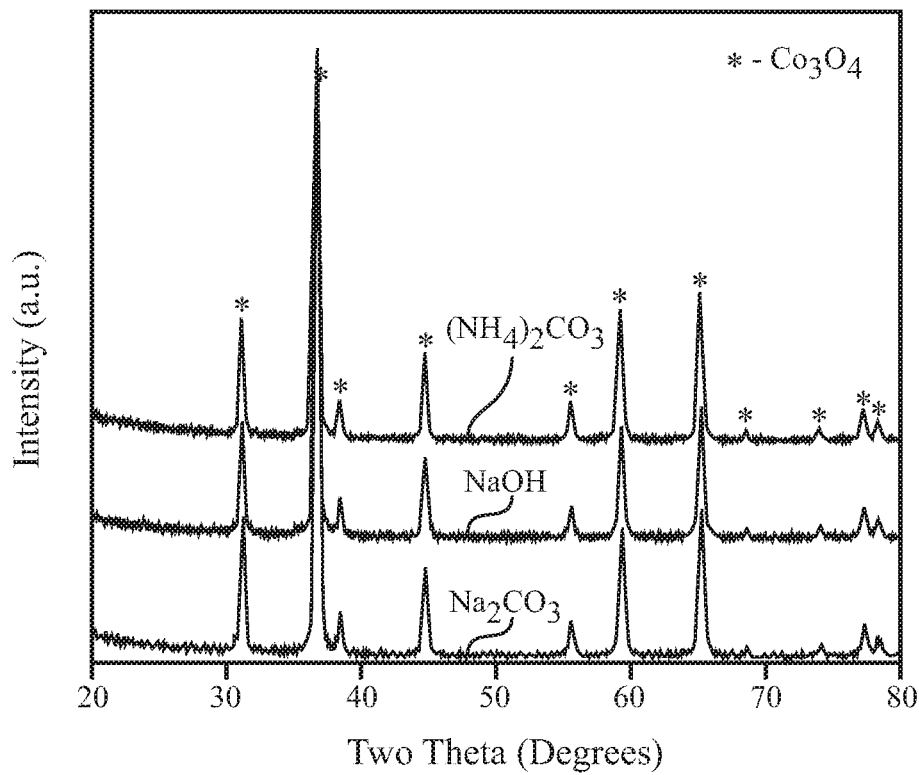
FIG. 1 shows composite x-ray diffraction (XRD) patterns for 5 wt. % loadings of $CuO_x$ on $Co_3O_4$ synthesized using different precipitating agents.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide an improved active catalyst for the treatment of a low temperature exhaust gas stream. The catalyst promotes the direct removal of nitrogen oxides from the exhaust gas stream. The low temperature, direct decomposition is accomplished without the need of a reductant (i.e., $H_2$, CO, $C_3H_6$, other hydrocarbons, and/or soot), thereby allowing improving fuel efficiency. Direct decomposition, as discussed herein, refers to catalytic transformation of nitrogen oxides to elemental nitrogen and oxygen. The catalyst is an (amorphous $CuO_x$)/$Co_3O_4$ catalyst where an amorphous layer is deposited by precipitation of $CuO_x$ from solution onto a $Co_3O_4$ support.

The presently disclosed catalyst system includes a method for dispersing copper oxide on a metal oxide support, specifically a $Co_3O_4$ spinel oxide with known $N_2O$ decomposition activity. The deposition is carried out by forming a layer of $CuO_x$ from an aqueous solution using a precipitant solution under controlled pH conditions. Upon washing and calcinating, the (amorphous $CuO_x$)/$Co_3O_4$ catalyst is found to be active with loadings displaying some amorphous $CuO_x$ up to about 10 weight percent, which exceeds that possible using an incipient wetness impregnation technique. Crystalline CuO in the amorphous $CuO_x$ is observable at about seven weight percent. The activity of the precipitated (amorphous $CuO_x$)/$Co_3O_4$ catalyst at about five weight percent amorphous $CuO_x$ loading (5.1 wt. %) is roughly fifteen percent greater than is that from the optimized catalyst prepared by the incipient wetness impregnation technique (4.6 wt. %).

As detailed herein, the present teachings not only include the development of the catalyst system, but also the use of the catalyst system with exhaust gas streams, particularly with catalytic converters for vehicles, automobiles, and the like, employing internal combustion engines.

The catalyst system of the present disclosure can be used in a chamber or an enclosure, such as a catalytic converter, having an inlet and an outlet. As known to those of ordinary skill in the art, such a chamber or enclosure can be configured to receive an exhaust gas stream through the inlet and to discharge the exhaust gas stream through the outlet, such that the exhaust gas stream has a particular or defined flow direction.

In an aspect of the invention, the (amorphous $CuO_x$)/$Co_3O_4$ catalyst displays an amorphous $CuO_x$ layer over a range of about three to about ten weight percent on the $Co_3O_4$ support. In contrast, catalysts formed by deposition of $CuO_x$ by the incipient wetness impregnation technique display an amorphous $CuO_x$ monolayer up to about 2.3 weight percent, where the catalyst displays optimal $NO_x$ reduction activity. At higher $CuO_x$ loadings by the incipient wetness impregnation technique, the $CuO_x$ becomes crystalline and a decreased activity is observed. Deposition of the $CuO_x$ by the precipitation method results in an amorphous structure to higher weight percentages on the (amorphous $CuO_x$)/$Co_3O_4$ catalyst. Where the amorphous $CuO_x$ deposition is formed at about five weight percent, the direct NO decomposition activity is roughly fifteen percent greater than that from the optimal $CuO_x$/$Co_3O_4$ catalyst prepared by the incipient wetness impregnation technique, employing essentially equivalent $Co_3O_4$ spinel oxide support.

In an aspect of the invention, a method for preparing the (amorphous $CuO_x$)/$Co_3O_4$ catalyst is carried out by employing a precipitation method. A suspension of particulate $Co_3O_4$ is prepared in a solution of $Cu(NO_3)_2$. The proportions of spinel oxide particles to $Cu(NO_3)_2$ is calculated for a desired $CuO_x$ loading on the support. A solution of a basic precipitation agent is slowly added to an agitated suspension. The precipitation agent can be $Na_2CO_3$, $K_2CO_3$, $Li_2CO_3$, $Rb_2CO_3$, $Cs_2CO_3$, $Fr_2CO_3$, or any combination thereof. The basic precipitation agent is added until the pH of the suspension achieves a level of about 9 to 10. Subsequent isolation of the resulting precipitate coated particles and washing with purified water results in effectively salt free suspended solids. After filtration and drying, the solids are ground into a fine powder and calcined at an elevated temperature.

The deposition-precipitation method, according to an aspect of the invention, can be carried out using a batch or continuous process for combination of the precipitant solution and the suspension. In this manner an aqueous copper nitrate solution is prepared to which the addition of the cobalt oxide particles results in a suspension. The particles can be provided with an average particle size of from about 5 to 1,500 nm. The $Co_3O_4$ support particles can be nanoparticles, for example, but not limited to, those with an average cross-section of from about 2 to about 100 nm, and in one non-limiting, example 21 nm. The slow addition of the basic precipitant solution can be carried out using at least one dropping funnel, or its equivalent, or at least one pump, where the profile of the addition is maintained to a desired rate and the rate can be accelerating or deaccelerating, such that the quality and throughput of the precipitated (amorphous $CuO_x$)/$Co_3O_4$ catalyst precursor is optimized. The appropriate agitation can be provided by at least one stirrer or other mixers. A continuous mixing loop can be constructed employing at least one active or passive inline mixer with a flow of the suspension through the loop. Alternately or additionally, mixing can be performed or augmented by cavitation that can be promoted by ultrasonic, piezoelectric, or other means.

Subsequent to formation of the precipitated (amorphous $CuO_x$)/$Co_3O_4$ catalyst precursor, removal of the resulting aqueous solution from the particles can be carried out by filtration or centrifugation. A filtration can be performed by imposing a pressure on the particle proximal side of a filter or reducing the pressure on the particle distal side of the filter. Subsequently, the solid particles are washed to remove water soluble salts. The washing can be carried out in a batch manner, where the particles are suspended in a purified water and re-filtered or re-centrifuged; or the particles are washed in a continuous manner by flowing purified water through the filter bed or centrifuge bed. The purified water can be distilled water, ion-exchanged water, or reverse osmosis purified water.

The washed (amorphous $CuO_x$)/$Co_3O_4$ catalyst precursor is dried. Drying can occur in an air, under nitrogen, an inert atmosphere, an oxygen rich atmosphere, or under vacuum. Drying can occur at temperatures from ambient to 120° C. depending upon the pressure employed during drying. The dried (amorphous $CuO_x$)/$Co_3O_4$ catalyst precursor is ground to a fine or superfine powder. Grinding can be carried out in any mill appropriate for the hardness of the material. For example, the mill can be, but is not limited to, a ball mill, a high compression roll mill, a roll mill, or a universal mill.

Subsequently, the dried (amorphous $CuO_x$)/$Co_3O_4$ catalyst precursor is calcined at temperatures in excess of 300° C., for example, but not limited to, 450° C. but less than 500° C., to provide the (amorphous $CuO_x$)/$Co_3O_4$ catalyst.

Figure 2:
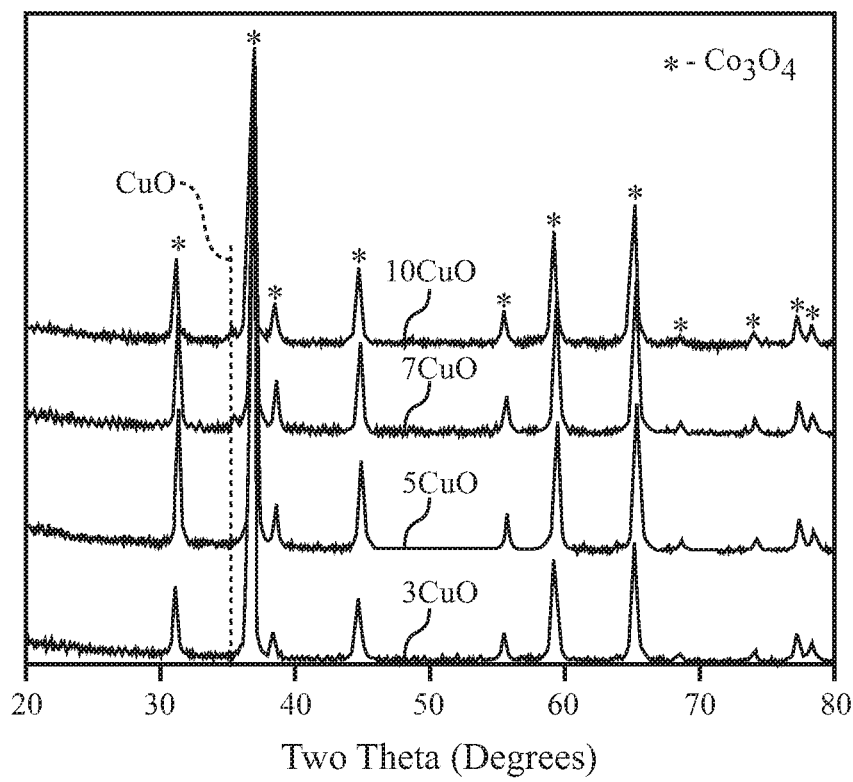
FIG. 2 shows composite x-ray diffraction (XRD) patterns for 3, 5, 7 and 10 wt. % loadings of $CuO_x$ on $Co_3O_4$ synthesized using $Na_2CO_3$ as the precipitating agent.
Figure 3:
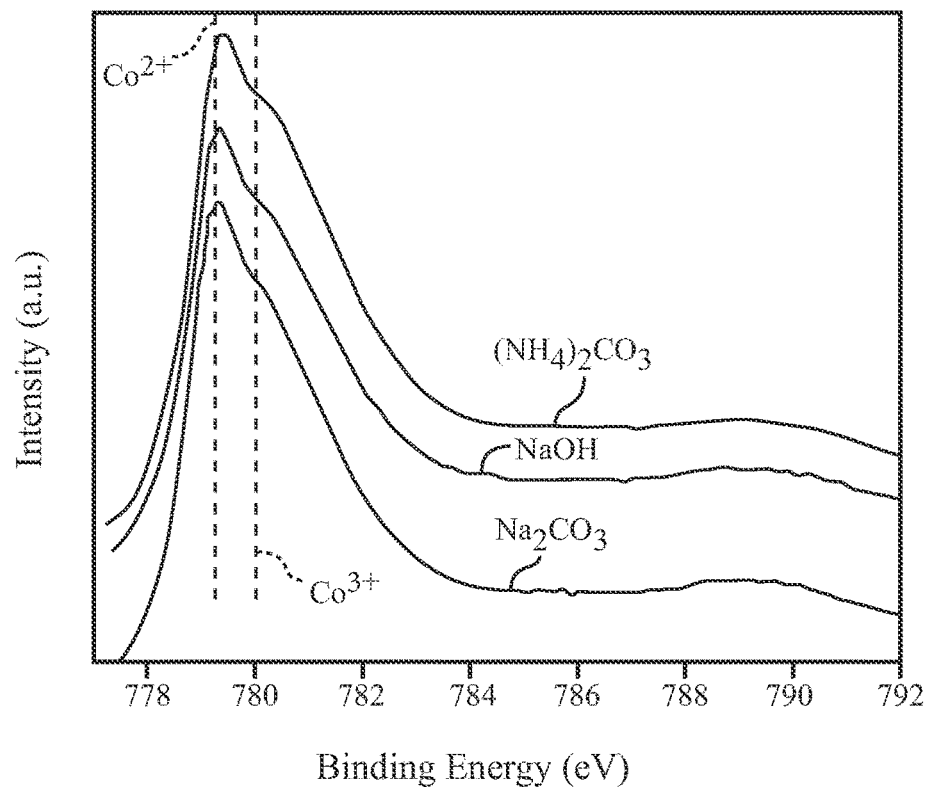
FIG. 3 is composite Co2p x-ray photoelectron (XPS) patterns for (amorphous $CuO_x$)/$Co_3O_4$ catalysts prepared from three different precipitating agents.
Figure 4:
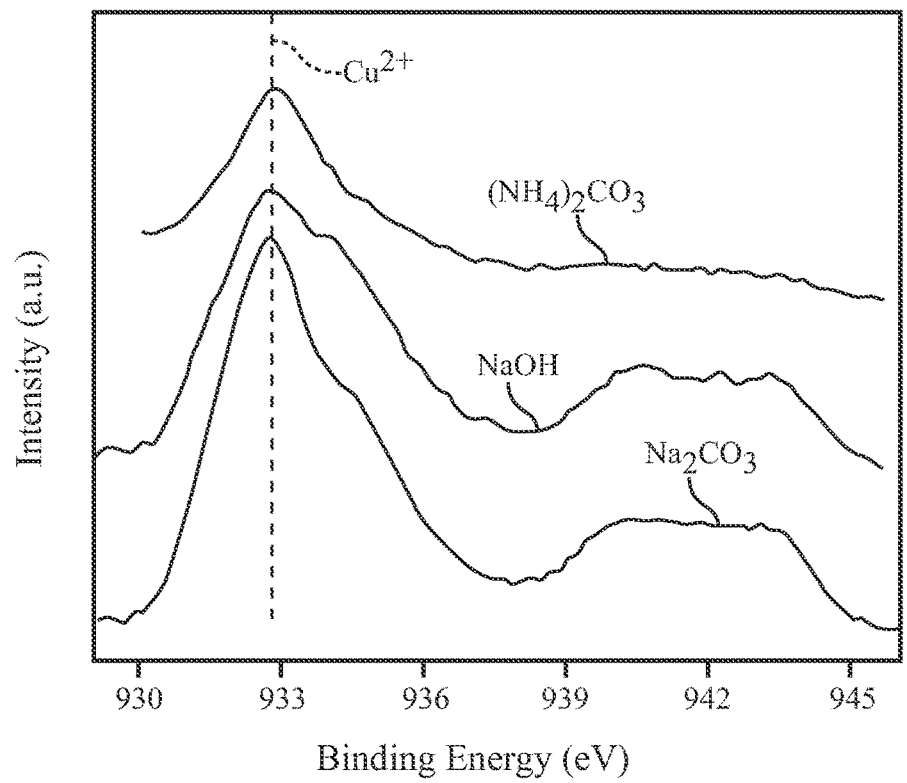
FIG. 4 is composite Cu2p x-ray photoelectron spectrometry (XPS) patterns for (amorphous $CuO_x$)/$Co_3O_4$ catalysts prepared from three different precipitating agents.

The (amorphous $CuO_x$)/$Co_3O_4$ catalyst can be characterized by X-ray powder diffraction (XRD) and X-ray photoelectron spectrometry (XPS). As can be seen in FIG. 1, for a 5 wt. % loading of $CuO_x$ from the various precipitating agents, an amorphous $CuO_x$ results as indicated by a lack of reflections from crystalline copper oxides. As shown in FIG. 2, as the loading of $CuO_x$ increases, XRD analysis of the catalyst powder displays reflections due to the $Co_3O_4$ spinel oxide but no reflections due to $CuO_x$, CuO, or other cobalt oxides in three and five weight percent samples, but displays some CuO at seven and 10 weight percent loading of $CuO_x$. Analysis by XPS, as shown in FIG. 3 and FIG. 4, under otherwise equivalent conditions, yields spectra whose features can be further analyzed to determine the relative quantity of $CuO_x$ residing on the $Co_3O_4$ support is affected by the identity of the precipitating agent. Clearly, use of the alkali metal carbonate, $Na_2CO_3$ results in higher loadings than the alkali metal hydroxide, NaOH, or the ammonium carbonate; which is given in Table 1 below where the Cu2p/Co2p ratio is given for the three precipitating agents.

TABLE 1

Cu2p/Co2p atomic ratios for (amorphous $CuO_x$)/$Co_3O_4$ catalysts synthesized using various precipitating agents

| Precipitating Agent | Cu2p/Co2p Ratio |
|---|---|
| $Na_2CO_3$ | 0.27 |
| NaOH | 0.24 |
| $(NH_4)_2CO_3$ | 0.05 |

Figure 5:
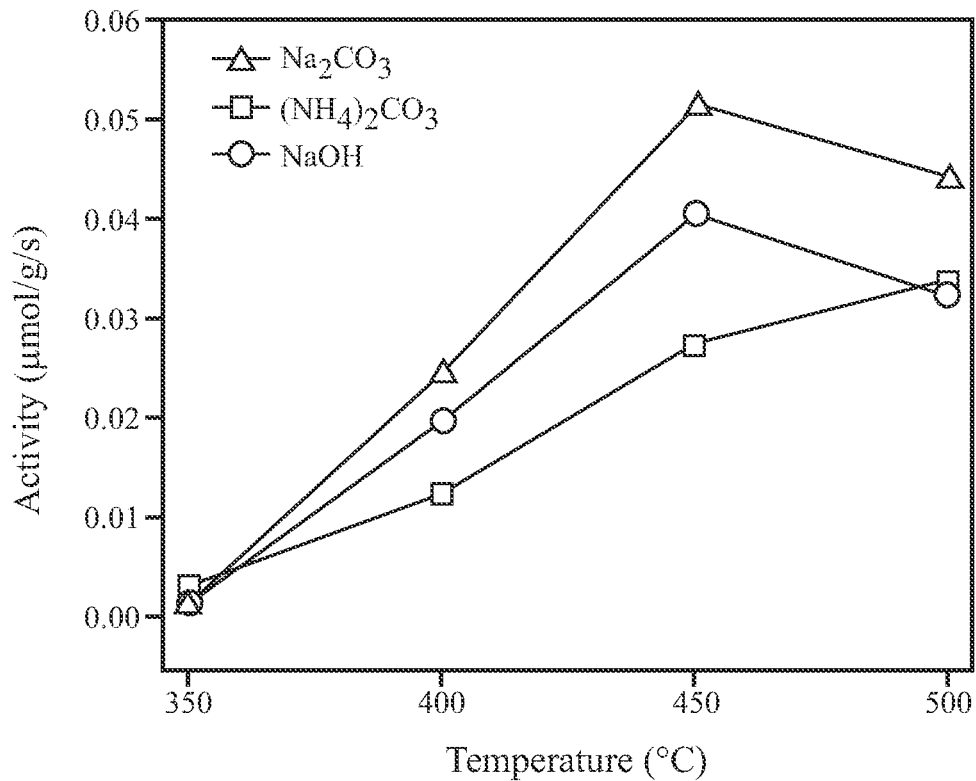
FIG. 5 is composite plots of direct NO decomposition activity for (amorphous $CuO_x$)/$Co_3O_4$ catalysts having 5 wt. % loading of $CuO_x$ prepared from three different precipitating agents.
Figure 6:
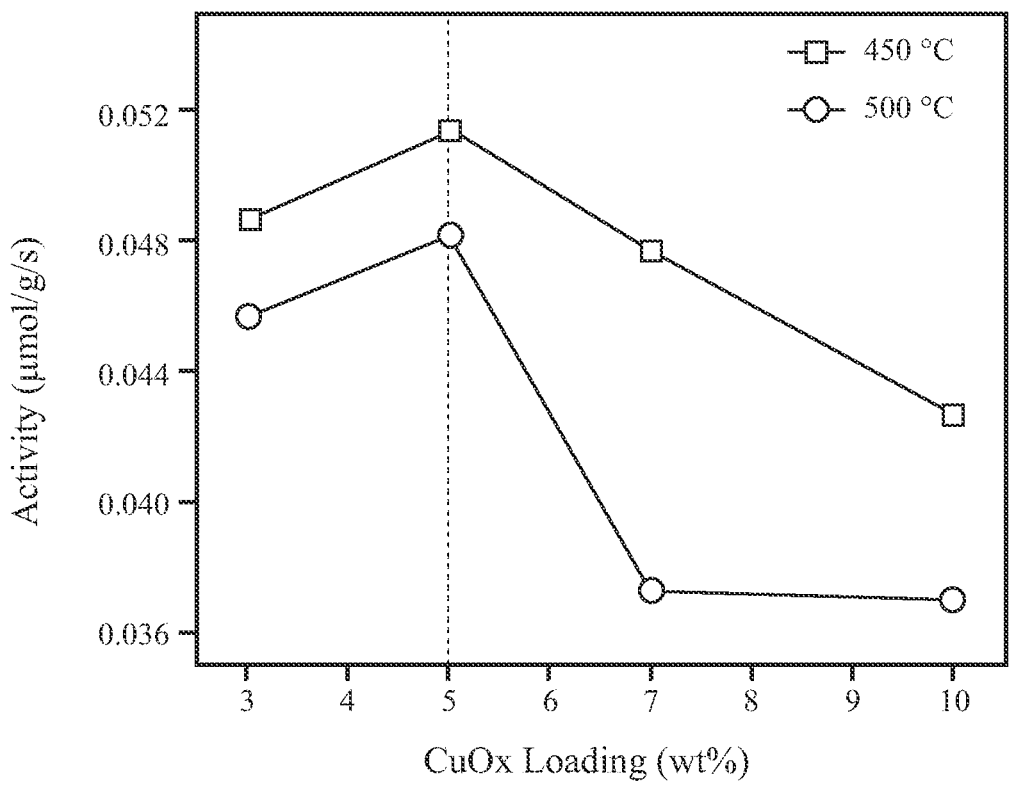
FIG. 6 is composite plots of direct NO decomposition activity for (amorphous $CuO_x$)/$Co_3O_4$ catalysts prepared with different $CuO_x$ loadings precipitated using from $Na_2CO_3$.

The differences displayed in structure of the (amorphous $CuO_x$)/$Co_3O_4$ catalysts from different precipitating agents is reflected in the direct NO decomposition activity, as can be seen in FIG. 5 for 5 wt. % loadings. The activity of the catalyst from $Na_2CO_3$ is clearly higher than those from NaOH and $(NH_4)_2CO_3$ at all temperatures in excess of 350° C. The activity is at its maximum at about 450° C. except for catalyst from the ammonium carbonate precipitating agent, which displays higher activity at higher temperatures. The catalytic activity depends upon the degree of loading of the $CuO_x$ on the $Co_3O_4$ support, as is illustrated in FIG. 6 for the amorphous $CuO_x$/$Co_3O_4$ catalyst prepared using sodium carbonate as the precipitating agent. At all $CuO_x$ loadings, the activity is greater at 450° C. than 500° C. At both temperatures, the activity is greatest at the 5 wt. % loading of the $CuO_x$ relative to the loadings of 3, 7, and 10 wt. %.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Methods

XRD patterns are obtained using Rigaku SmartLab X-ray Diffractometer using Cu Ka radiation (1¼ 1.5405 A) with a glass holder as the sample support. The scanning range is from 10 to 80 (2θ) with a step size of 0.02 and a step time of 1 s. The XRD phase present in the samples is identified in reference to ICDD-JCPDS data files.

XPS measurements are performed using PHI 5000 Versa Probe II X-ray Photoelectron Spectrometer using an Al Kα source. Survey scans (with 187.85 eV pass energy at a scan step pf 0.8 eV) and high resolution (O1s), (Co2p), (Cu2p), and (C1s) scans (with 23.5 eV pass energy at a scan step of 0.1 eV) were performed. Changing the catalyst samples was corrected by setting the binding energy of the adventitious carbon (Cis) to 284.6 eV. The XPs analysis was performed at ambient temperature and at pressures typically on the order of $10^{-7}$ Torr. Prior to the analysis, the samples were outgassed under vacuum for 30 minutes.

Direct $NO_x$ decomposition measurements were performed in a fixed bed flow reactor using ~1% $NO_x$ balance helium with a gas hourly space velocity of 2,100 $h^{-1}$ at a temperature region of 500° C. Catalysts pretreatment was at 450° C. in the presence of 20% $O_2$/He. After pretreatment, bed temperature was cooled to 350° C. in the presence of He. Direct $NO_x$ decomposition measurements were collected in the temperature range of 350° C. to 500° C. using 50° C. intervals.

Synthesis of (Amorphous $CuO_x$)/$Co_3O_4$ Catalyst (Amorphous $CuO_x$)/$Co_3O_4$ catalysts having a five weight percent $CuO_x$ deposition were synthesized where a basic precipitating agent, either $(NH_4)_2CO_3$, NaOH, or $Na_2CO_3$, was added to a $Co_3O_4$ spinel oxide suspension in a $Cu(NO_3)_2$ solution. The solution of $Cu(NO_3)_2$ was formed by combining the salt with deionized water, to which $Co_3O_4$ spinel oxide nanoparticles, at 19 times the mass of the $Cu(NO_3)_2$ in solution, were mixed by stirring to form the suspension. To the stirred suspension was added a 0.25 to 0.75 M precipitating agent. Using a pH meter, the precipitating agent was added dropwise until 200 mL of the solution resulted in a pH of 9-10. The stirring was stopped, the supernatant solution was decanted, and subsequently the remaining solution was filtered from the solids using filter paper. The filtered solids were washed multiple times with distilled water. The washed solids were dried overnight in an oven at 120° C. Using a mortar and pestle A fine powder was prepared. The fine powder was calcined in air at 2° C./min to 450° C. where it was maintained at that temperature for 1 hour.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst system for the direct decomposition removal of $NO_x$ from an exhaust gas stream provided at a temperature of less than about 600° C., the catalyst system comprising an (amorphous $CuO_x$)/$Co_3O_4$ catalyst comprising a precipitated amorphous $CuO_x$ deposit on surfaces of $Co_3O_4$ spinel oxide particles and configured to catalyze reduction of the $NO_x$ to generate $N_2$ without the presence of a reductant, wherein the precipitated amorphous $CuO_x$ deposit is formed from a mixture of $Cu(NO_3)_2$ and an alkali metal carbonate and is equal to or greater than 3 weight percent of the $Co_3O_4$ spinel oxide.

2. The catalyst system according to claim 1, wherein the alkali metal carbonate is $Na_2CO_3$.

3. The catalyst system according to claim 1, wherein the precipitated amorphous $CuO_x$ deposit is equal to or greater than 5 weight percent of the $Co_3O_4$ spinel oxide.

4. A catalytic converter for the direct decomposition removal of $NO_x$ from an exhaust gas stream flowing at a temperature of less than or equal to about 600° C., the catalytic converter comprising:
an inlet configured to receive the exhaust gas stream into an enclosure;
an outlet configured to allow the exhaust gas stream to exit the enclosure; and
a catalyst system contained inside the enclosure, the catalyst system comprising an (amorphous $CuO_x$)/$Co_3O_4$ catalyst comprising a precipitated amorphous $CuO_x$ deposit on surfaces of $Co_3O_4$ spinel oxide particles and configured to catalyze reduction of the $NO_x$ to generate $N_2$ without the presence of a reductant, wherein the precipitated amorphous $CuO_x$ deposit is formed from a mixture of $Cu(NO_3)_2$ and an alkali metal carbonate and is equal to or greater than 3 weight percent of the $Co_3O_4$ spinel oxide.

5. The catalytic converter according to claim 4, wherein the $Co_3O_4$ spinel oxide particles are nanoparticles, having an average diameter of from about 2 to about 100 nm.

6. The catalytic converter according to claim 4, wherein the alkali metal carbonate is $Na_2CO_3$.

7. The catalytic converter according to claim 4, wherein the precipitated amorphous $CuO_x$ deposit is equal to or greater than 5 weight percent of the $Co_3O_4$ spinel oxide.

8. The catalytic converter according to claim 4, configured to flow the exhaust gas stream through the catalyst system at a temperature at or less than about 500° C.

9. The catalytic converter according to claim 4, configured to flow the exhaust gas stream through the catalyst system at a temperature at or less than about 400° C.

10. A method for direct decomposition removal of NOx from an exhaust gas stream, the method comprising:
flowing the exhaust gas stream through a catalyst system and contacting the exhaust gas stream to a multiplicity of surfaces of the catalyst system, the catalyst system comprising an (amorphous $CuO_x$)/$Co_3O_4$ catalyst comprising a precipitated amorphous $CuO_x$ deposit on surfaces of $Co_3O_4$ spinel oxide particles, and configured to catalyze a reduction of the $NO_x$ to generate $N_2$ without the presence of a reductant, wherein the precipitated amorphous $CuO_x$ deposit is formed from a mixture of $Cu(NO_3)_2$ and an alkali metal carbonate and is equal to or greater than 3 weight percent of the $Co_3O_4$ spinel oxide.

11. The method according to claim 9, comprising flowing the exhaust gas stream through the catalyst system at a temperature at or less than about 500° C.

12. The method according to claim 9, comprising flowing the exhaust gas stream through the catalyst system at a temperature at or less than about 400° C.

13. A method for preparing an (amorphous $CuO_x$)/$Co_3O_4$ catalyst for the direct decomposition removal of $NO_x$, comprising:
providing a suspension comprising $Co_3O_4$ spinel oxide particles in a solution of $Cu(NO_3)_2$;
precipitating a copper comprising deposit on the $Co_3O_4$ spinel oxide particles by the mixing of a precipitant solution comprising an alkali metal carbonate with the suspension to form an (amorphous $CuO_x$)/$Co_3O_4$ catalyst precursor suspension,
washing the water-soluble components from the (amorphous $CuO_x$)/$Co_3O_4$ catalyst precursor suspension with deionized water;
isolating wet (amorphous $CuO_x$)/$Co_3O_4$ catalyst precursor;
drying the wet (amorphous $CuO_x$)/$Co_3O_4$ catalyst precursor to form a dry (amorphous $CuO_x$)/$Co_3O_4$ catalyst precursor; and
calcining the dry (amorphous $CuO_x$)/$Co_3O_4$ catalyst precursor to a temperature of 450° C. to form the (amorphous $CuO_x$)/$Co_3O_4$ catalyst.

14. The method according to claim 13, wherein mixing comprises adding the precipitant solution to the suspension at a rate that permits maintenance of a pH below 10 and mixing continues until the pH is in the range of 9 to 10.

15. The method according to claim 13, wherein the alkali metal carbonate is $Na_2CO_3$.

16. The method according to claim 13, wherein calcining is by heating the dry (amorphous $CuO_x$)/$Co_3O_4$ catalyst precursor at a rate of about 2° C. per minute to a temperature of about 450° C.

* * * * *